UNITED STATES PATENT OFFICE.

RICHARD GRÄTZEL, OF HANOVER, PRUSSIA, GERMANY.

PROCESS OF MAKING FLUORINE SALTS.

SPECIFICATION forming part of Letters Patent No. 338,061, dated March 16, 1886.

Application filed October 5, 1885. Serial No. 179,077. (No specimens.)

*To all whom it may concern:*

Be it known that I, RICHARD GRÄTZEL, a subject of the King of Prussia, and residing at Hanover, Prussia, German Empire, have invented an Improved Method of Producing Haloid Compounds of Metals, of which the following is a specification.

My invention relates to the production of certain haloid compounds of metals; and more especially it consists in the manufacture of fluoride of aluminium and double fluorides of aluminium and potassium, or of aluminium and sodium from fluorides of alkali metals by treatment with chloride of aluminium.

The invention also involves the production from native or other compound fluorides of aluminium and potassium or sodium by means of chloride of aluminium, of fluoride of aluminium alone, or of double fluorides of aluminium and potassium or sodium which contain more aluminium fluoride than the original compounds.

In case a simple fluoride of an alkali metal is to be used in the process, this substance, as well as the aluminium chloride, (which are both soluble,) is dissolved in water, which may be warm or cold, and the solutions mixed together. By double decomposition fluoride of aluminium and alkalic chloride will then be formed, the former of which, being insoluble, falls to the bottom. The precipitate is separated from the liquid and washed with water, if required. The proportion in which the said substances should be employed, in order to produce by their action on each other simple salts, are six chemical equivalents of alkalic fluoride to one equivalent of aluminium chloride. With sodium fluoride, the process will then come off according to the equation: $6NaF + Al_2Cl_6 = Al_2F_6 + 6NaCl$. In case a greater relative quantity of alkalic fluoride is employed, the exceeding portion will combine with the aluminium fluoride produced, or a portion thereof, to form a double or compound salt of the constitution of cryolite. Thus with twelve equivalents of sodium fluoride instead of six equivalents, as before, the process taking place will be as follows: $12NaF + Al_2Cl_6 = (Al_2F_6 + 6NaF) + 6NaCl$. The proportion in which the two substances are mixed may, however, be varied for the purpose of producing double salts containing more or less fluoride of aluminium.

When a compound fluoride of aluminium and of an alkali metal—such as cryolite—is to be subjected to the treatment with aluminium chloride, in view of producing simple aluminium fluoride, it is finely powdered and mixed with a solution of aluminium chloride containing so much of this salt as is required to decompose the whole of the alkalic fluoride contained in the compound fluoride. With native cryolite ($Al_2F_6 + 6NaF$) the reaction may be rendered by the equation: $(Al_2F_6 + 6NaF) + Al_2Cl_6 = 2Al_2F_6 + 6NaCl$—that is to say, the fluoride of sodium in the cryolite is transformed by the chloride of aluminium into fluoride of aluminium and chloride of sodium, while the fluoride of aluminium already present remains and forms, with the newly-produced like substance, an insoluble precipitate, which is then separated from the solution of chloride of sodium and washed, as before. In this case one equivalent of the aluminium chloride has been supposed to be employed with one equivalent of the compound fluoride; but if the quantity of the chloride used is less in proportion to the latter, only a portion of the alkalic fluoride will be transformed into aluminium fluoride, and a modified compound fluoride will be obtained which contains a higher percentage of aluminium fluoride than the original salt. Thus with three equivalents of cryolite (in powdered state) and one equivalent of aluminium chloride dissolved in water, a compound fluoride will be produced containing twice as much aluminium fluoride as the cryolite. This is shown by the equation: $3(Al_2F_6 + 6NaF) + Al_2Cl_6 = (4Al_2F_6 + 12NaF) + 6NaCl$.

I am aware of the use of double chloride, cryolite, and sodium in the furnace mixture of Deville for the reduction of aluminium, and disclaim invention therein.

I claim as my invention—

1. The process of causing aluminium chloride to act in solution on an alkalic fluoride, and of separating from the liquor the precipitate obtained, substantially as and for the purpose described.

2. The process of causing a solution of aluminium chloride to act on an alkalic fluoride combined with aluminium fluoride, and of separating the solid from the liquid portion, substantially as and for the purpose specified.

In testimony whereof I have signed my name to this specification in the presence of two subscribing witnesses.

RICHARD GRÄTZEL.

Witnesses:
HENRY SPRINGMANN,
B. ROI.